Figure 1:
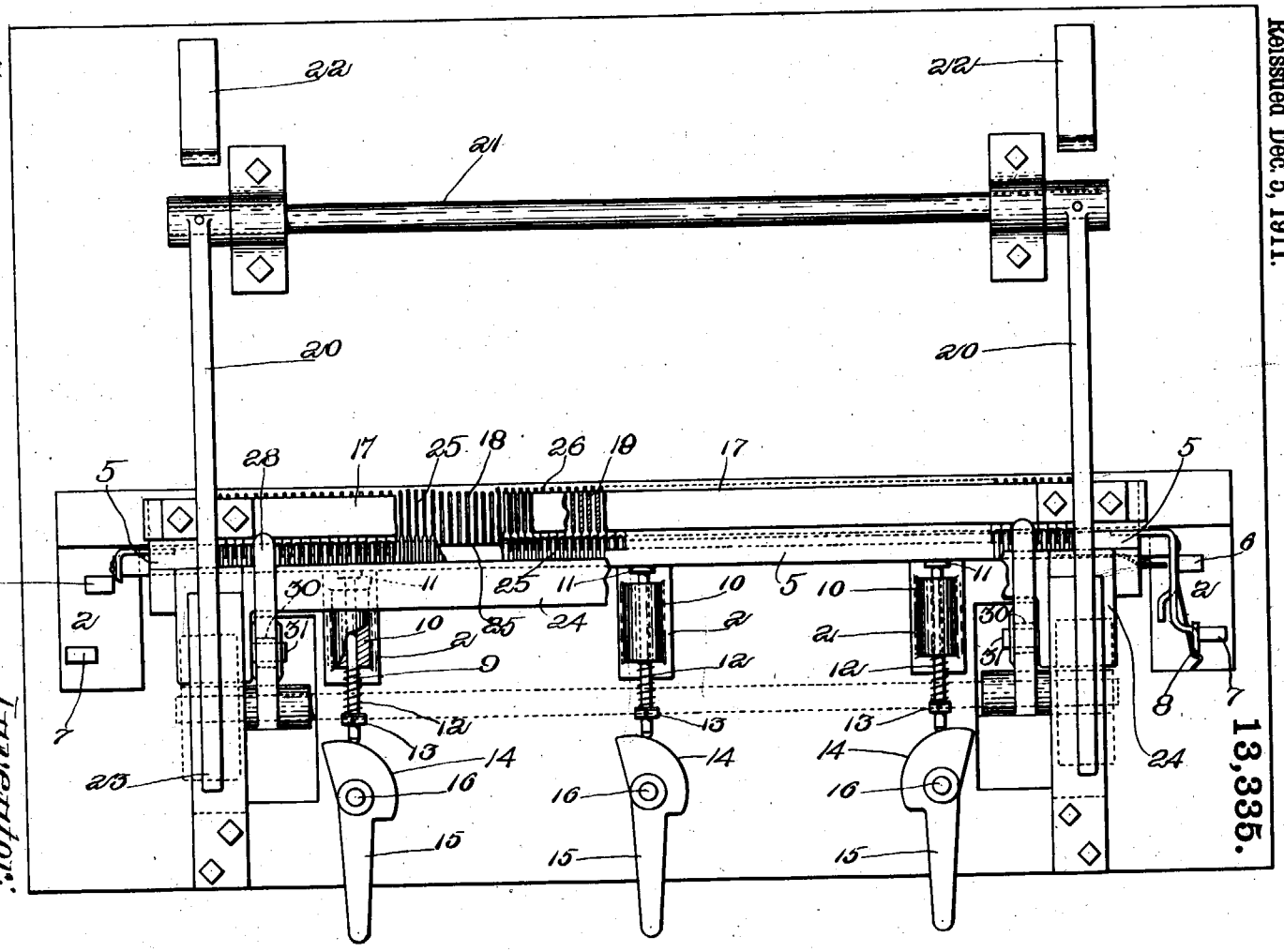

T. P. WALSH.

MACHINE FOR STRAIGHTENING TUBE FRAMES FOR AXMINSTER LOOMS.

Reissued Dec. 5, 1911. APPLICATION FILED NOV. 2, 1911. 2 SHEETS—SHEET 1.

13,335.

Witnesses:
L. B. Weymouth.
H. C. Bowen.

Inventor:
Thomas P. Walsh
by Geo. H. Maxwell
Atty.

COLUMBIA PLANOGRAPH CO., WASHINGTON, D. C.

T. P. WALSH.

MACHINE FOR STRAIGHTENING TUBE FRAMES FOR AXMINSTER LOOMS.

APPLICATION FILED NOV. 2, 1911.

Reissued Dec. 5, 1911.

2 SHEETS—SHEET 2.

13,335.

Witnesses:
L. R. Weymouth.
H. C. Bowen.

Inventor:
Thomas P. Walsh
by Geo. H. Maxwell,
Atty.

COLUMBIA PLANOGRAPH CO., WASHINGTON, D. C.

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

MACHINE FOR STRAIGHTENING TUBE-FRAMES FOR AXMINSTER LOOMS.

13,335. Specification of Reissued Letters Patent. Reissued Dec. 5, 1911.

Original No. 1,006,811, dated October 24, 1911, Serial No. 513,726. Application for reissue filed November 2, 1911. Serial No. 658,287.

*To all whom it may concern:*

Be it known that I, THOMAS P. WALSH, a citizen of the United States, residing at Boston, in the county of Suffolk and State of Massachusetts, have invented an Improvement in Machines for Straightening Tube-Frames for Axminster Looms, of which the following description, in connection with the accompanying drawings, is a specification, like letters on the drawings representing like parts.

In weaving such fabrics as Axminster carpets and the like, the tube frames which are used in the looms in connection with the pattern spools are frequently injured in the process of weaving, some of the tubes being deflected more or less out of alinement with the rest of the tubes, some of the tubes dented at their edges or bent at their sides, and the free ends sometimes upset or jammed, and the present practice in such factories is to have each tube of the tube frame separately examined and straightened by a skilled mechanic by means of hand tools such as pliers, hand mandrels, wedge, file, etc., this process being necessarily slow and expensive and also sometimes inaccurate. Accordingly to accomplish this work rapidly and also to bring the tube frames to that degree of accuracy necessary for use in connection with my spooling and drawing-in machine, I have devised the mechanism herein set forth. These tube-frames are necessarily light and frail, comprising a small slat-like carrier of wood, to which is tacked a strip or a series of tubes, of light sheet-tin, arranged side by side, an average of 84 tubes to the foot, said tubes being each two inches long, simply soldered to each other at their extreme butt ends at the point where they are tacked to the wooden carrier or bar, and thence projecting free of each other and entirely unsupported excepting as stated at their butt ends, each tube being $\frac{3}{8}$ inch deep at its butt end, $\frac{1}{4}$ inch deep at its free end, which has a wedge-shaped open interior $\frac{3}{32}$ of an inch across at the top edge and tapering down to $\frac{1}{32}$ of an inch at the opposite or bottom edge; so that great care and delicacy of handling are necessary, and it has never heretofore been considered feasible to straighten them excepting by the hand of a skilled mechanic, as above stated. I have succeeded, however, in devising mechanism which although quick and strong, handles these delicate, thin-walled, frail, tapering tubes deftly, daintily and without any liability to injure them, and yet reforms them all together, performing simultaneously both the alining of the tubes, *i. e.*, bringing them into lengthwise position, and the correct shaping of the tapering wedge-shaped walls, in case said walls have been dented, pinched, twisted, or in any way whatever distorted.

Stated in general terms my present machine comprises means for positioning and holding tube frames in an unvarying position while being straightened and adjusted, means for accurately alining all the tubes of the tube frame, and mechanism for straightening and truing the interior walls and edges of the respective tubes.

Figure 2:
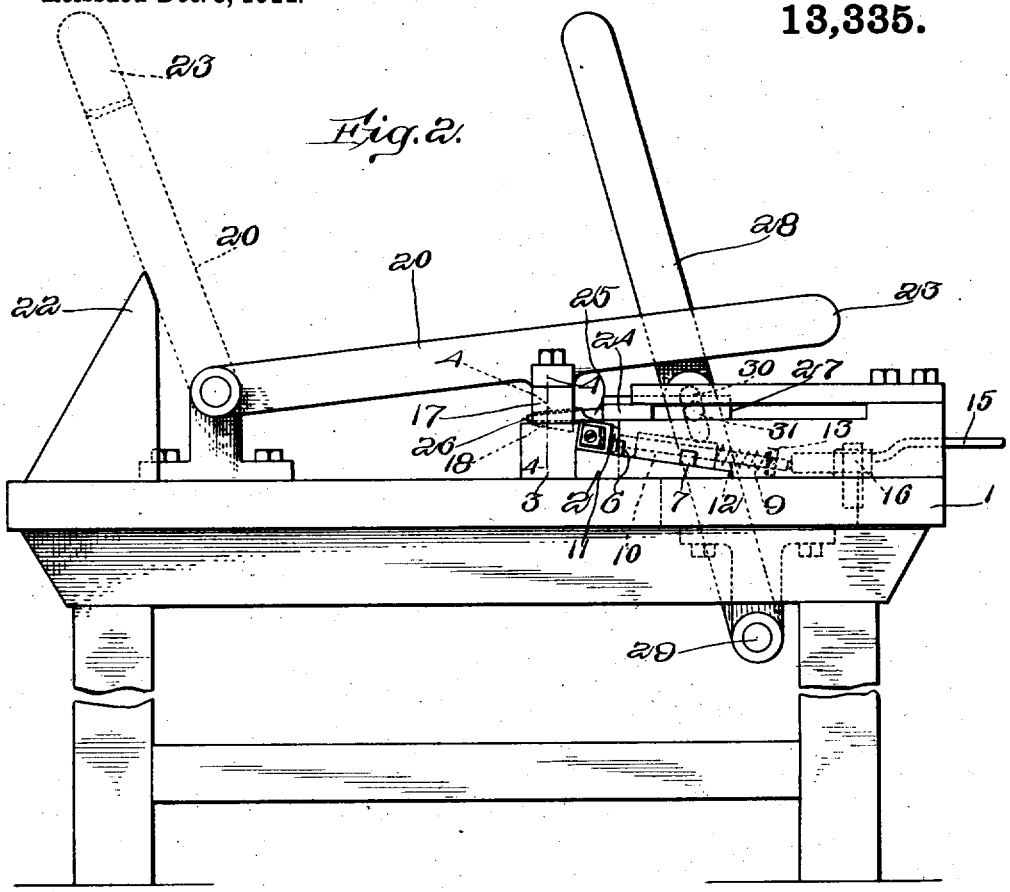
Figure 3A:
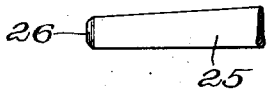
Figure 3:
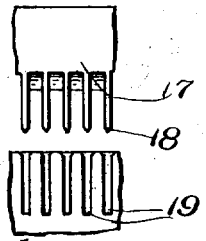
Figure 4:
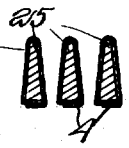
Figure 5:
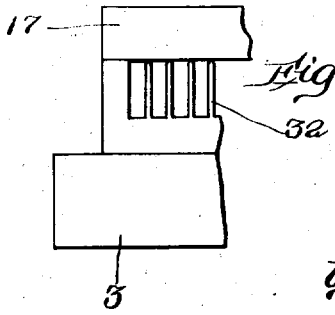

In the accompanying drawings, in which I have shown a preferred embodiment of my invention, Figure 1 is a top plan view of the machine; Fig. 2 shows the same in end elevation; Fig. 3 is an edge view looking forward against the alining tool; Fig. 3[a] is a side view and Fig. 4 is a vertical transverse sectional view of the straightener prongs or teeth of the forming tool; and Fig. 5 is a view similar to Fig. 3 of a modification.

On a suitable base 1 is a support for the tube frame, herein shown as comprising a plurality of supporting blocks 2, and in front of these blocks is a transverse supporting bar or ledge 3 for supporting the tubes 4 of the tube frame, the transverse wooden carrier portion 5 of said tube frame resting on said blocks 2, which accordingly have their top surface at such an angle with relation to the supporting surface of the bar 3 as may be required by the given kind of tube frame which the machine is desired to handle. In the drawings I have shown the machine adapted to handle tube frames for the Smith loom, and accordingly said blocks are oblique or sloping, whereas for the Crompton & Knowles tube frames said top surface of the blocks would be level inasmuch as the tubes project from the carrier portion parallel to the latter in said Crompton & Knowles construction. Positioning lugs or bosses 6, 7, are provided to engage the opposite ends of the carrier frame whereby the tubes thereof are compelled to occupy invariably one and the same endwise position when placed in the machine, said bosses 6 and 7 being preferably formed integrally with the end blocks 2 or at least secured immovably thereto so that no variation can possibly take place in positioning the tube frames. The blocks 6 are preferably located in line with the opposite ends of the wooden portion or tube carrier part of the frame and the blocks 7 are preferably located to be engaged by the projecting ends 8 of the metal end portions or end holders of the tube frame to gage the said end holders and thereby enable the operator to see at a glance whether said end holders have been sprung and therefore need attention. On the intermediate blocks 2 I provide clamping mechanism, herein shown as comprising plungers 9 sliding in bearings 10 and provided with heads 11 to engage and press forward the wooden portion 5 of the tube frame against the front vertical wall of the bar 3, so that the tubes of the tube frame cannot possibly be deflected because of any spring or improper positioning of the carrier 5. The clamping plungers 9 are normally held under tendency to move rearwardly by springs 12 engaging collars 13 and are actuated by the engagement with said plungers of the cam ends 14 of levers 15 pivoted at 16 to the base 1. As herein shown there are three of these clamping mechanisms and they are preferably operated independently so that the operator may with greater accuracy adjust the different portions of the tube frame. The aliner, or tool which brings the separate tubes into proper alinement with each other throughout the length of the tube frame, moves preferably vertically above the tubes, being herein shown as comprising a transverse plate 17 provided on its under side with grooves corresponding accurately to the position of the tubes and approximately to the shapes of the tubes so as to provide between said grooves longitudinal ribs or fingers 18 which constitute means for entering between adjacent tubes and compelling them to get into proper alinement with each other throughout the entire length of the tube frame. Saw kerfs or slits 19 are preferably provided in the bar 3 to receive the lower ends of these ribs or alining devices 18, and the latter are also preferably longer at their front ends than at their rear ends so that their lower edges are inclined as shown clearly in Fig. 2, thereby facilitating the wedging or straightening-out operation which they are intended to perform. The plate 17 is carried by levers 20 preferably located at its opposite ends, said levers being fast on a shaft 21 journaled in bearings at the rear side of the machine, horns or rests 22 receiving and supporting the levers 20 and plate 17 when not in use. The levers 20 terminate in handles 23, said handles being preferably so located as to permit the operator to use both hands if necessary in forcing the alining plate downward over and between the tubes. In front of the tubes, so as to enter the enlarged ends of the latter which are relatively fixed in position and hence always in substantially their proper place, is the straightening and forming or shaping tool, which is very much like a comb, each tooth of which constitutes a shaper or former to enter within the tube and compel the walls and top and bottom edges of the tube, if bent, dented, twisted, or broken, to come back into proper shape as the shaper is forced forward against said walls and edges of the tube. This shaper or former comprises, in the machine of the drawings, a transverse plate 24 from whose front edge project a series of shaping teeth or formers 25 having the same external shape and relative arrangement as the true internal surface shape and arrangement of the tubes. Preferably the shaping teeth or formers 25 are longer than the tubes and are provided with wedge shaped ends 26 which facilitate the entrance of the teeth into dented or distorted tubes and pass out beyond the ends of said tubes when the shaper has been given its complete forward movement, so as to true up the extreme edge of the tube as well as all the remaining part of the tube. These teeth or formers 25 and their carrying plate 24 are supported at their ends by end pieces 27 sliding in guideways and operated by end levers 28 pivoted at 29 to the frame of the machine and connected to said pieces 27 by any suitable means as by slots 30 engaged by pins 31 projecting rigidly from said end pieces 27.

I prefer to have each of the operating mechanisms of my apparatus independently operated by hand, in order that the operator may use his skill in bringing about the best results, and I have purposely arranged the levers so that he can use both hands and can bring special pressure at one end or at the other as may be required by any specially obstinate tube or similar situation, but it will be understood that in this respect as well as in the general construction of the apparatus, I am not limited to these preferred details as I believe that my invention is the first for accomplishing by an organized machine the results herein set forth, and accordingly I intend the claims to be commensurate with the invention as thus broadly characterized. I prefer to aline and strengthen all the tubes simultaneously but wish it understood that this is a preferred construction only, and also I prefer to accomplish the alining by a movement transverse of the tubes, as distinguished for instance from a movement longitudinal of the tubes, and I prefer to remove indentations and smooth out the side walls of the tubes by means of a wedging form of expander, preferably moving longitudinally within the tubes, but in all these respects it will be understood that these are preferred constructions only and do not exclude other equivalent means within the scope of the broader of the claims hereinafter set forth.

In use, the successive tube frames as they come from the loom are placed one at a time in the machine, some having only exceedingly slight distortion or defect and others being very badly injured. The operator places the frame by hand so that its ends abut against the positioning bosses 6, 7, and the wooden carrier portion 5 of the frame occupies as nearly as practicable its normal position on the blocks 2 and against the bar 3. Thereupon he grasps the handles 23 and swings the aliner forward and downward so that the relatively long rib-like fingers or knife-like members 18 can enter the spaces between adjacent tubes of the tube frame and thereby compel the tubes to get into proper alinement with each other. This is further facilitated by the fact that the members 18 are longer at their front ends and hence their front lower corners enter between the butt ends of the tubes close to where the latter are soldered together and hence much more liable to be in true position, and then the rear or following edge-portion of the members 18 wedge against the deflected side of the tube and tend to compel it to straighten out or get into alinement in case it is especially bent. Thereupon the operator forces the tube frame into absolutely true position by means of the handles 15. Having thus brought the various tubes of the tube frame into their true positions so far as alinement and general position are concerned, the shapers or expanders are brought forward. The operator swings the levers 28 forward, thereby moving the former straight ahead, while the wedge-shaped ends 26 of the shaping devices or comb-like teeth or expanders 25 enter the large butt ends of the tubes and as they slide and wedge their way forward through the tubes they iron out or smooth out flat and into proper shape the side walls and edges of the respective tubes. The shaping teeth 25 are preferably stiff enough to accomplish this straightening result themselves but their operation is materially facilitated by the aliners 18, and particularly so when the lower edges of said aliners are held in the grooves of the bar 3 as shown in Fig. 3 so that they are thereby stiffened and cannot possibly shift laterally. As the operator moves the shapers or expanders 25 of the former gradually forward they smooth out the relatively thin metal walls of the tubes (if necessary against the members 18, being thereby capable of straightening such tubes as otherwise would be particularly obstinate). Under ordinary circumstances however, as already stated, the wedge-shaped shapers or former teeth 25 will straighten and smooth out the inner walls of the tubes properly by simply being forced into the tubes, inasmuch as said shapers have the same external size and shape as the desired internal shape of the tubes. From the foregoing description it will be evident that by means of my apparatus the tube frames are quickly restored to their true shape and alinement ready for receiving the threads by my automatic threading machine. As already stated, the mechanism varies according to the particular kind of tube frame being handled. For instance, in Fig. 5 I have shown a variation thereof provided for the Crompton & Knowles tube frame. In this tube frame the flat edge of the tube is on top and the thin edge at the bottom, being in this respect the reverse of the Smith tube frame previously mentioned, and accordingly instead of having the plate 17 provided with the alining ribs, I provide similar alining ribs 32 stationary on the bar 3, so that the plate 17 simply operates to engage the flat edges of the tubes and force the latter down over the stationary alining ribs 32.

Having described my invention, what I claim as new and desire to secure by Letters Patent is, 1. A machine for straightening loom tube-frames, comprising means for holding the tube frame in a predetermined position, and coöperating alining mechanism movable relative to said tube-frame holder for bringing the tubes at all points from their extreme outer thin-walled ends to their butt-ends into their correct relative lengthwise positions in the frame.

2. A machine for straightening loom tube-frames, comprising means for holding in a predetermined position the tube frame and its thin-walled, flattened, tapering tubes, certain of which are distorted and are to be corrected, and coöperating alining means and operating mechanism therefor for simultaneously bending and reshaping the individual deflected walls of the distorted tubes into their correct lengthwise position in the frame.

3. A machine for straightening the thin-walled, tapering tubes of loom tube-frames, comprising means for fixedly clamping the tube-frame so as to leave the tubes projecting freely therefrom, and coöperating mechanism having means adapted to fit the normal interior of said tapering tubes for entering and reshaping distorted tubes while the frame is thus held.

4. A machine for straightening loom tube-frames, comprising means for holding the tube frame in a predetermined position with its contiguous, thin, tapering, slender, freely projecting tubes in fixed position to receive and be engaged by the alining and shaping devices, and coöperating devices for bending and alining the tubes to true lengthwise position in all directions while the frame is thus held and restoring the walls of said tubes to proper yarn-receiving shape and position.

5. In a machine for straightening the thin-walled, tapering tubes of loom tube-frames, means for supporting said frames, and a single forming device for each of said tubes, shaped to conform to the normal interior walls of said tubes when inserted therethrough to expand and restore to original shape the thin tapering wall of an indented or distorted tube, and operating means therefor.

6. In a machine for straightening the thin-walled, tapering tubes of loom tube-frames, means for holding such frames, and a single forming device for each tube having a finger shaped to enter a tube, of a shape and character to engage all portions thereof for flattening out the indented and distorted internal wall surfaces of said tube and restoring the same to proper operative condition, and means for causing relative rectilinear movement between said forming device and said tube in the exact direction with relation to the tube-frame for alining the restored tube with the rest of the tubes of the frame.

7. In a machine for straightening loom tube frames, means for alining and straightening the tubes of the tube frame from distortion in any direction, and operating mechanism for relatively moving said means and tube frame for effecting said alining and straightening.

8. In a machine for straightening loom tube frames, alining means to enter between the tubes to engage and thereby straighten the deflected tubes from distortion in all directions, and operating mechanism for effecting the required relative movement between said means and said tubes.

9. In a machine for straightening loom tube frames, alining means to enter between the tubes to straighten the deflected tubes laterally, and coöperating straightening means to engage the top longitudinal edge of the tubes.

10. In a machine for straightening loom tube frames, alining means to enter between the tubes to straighten the deflected tubes laterally, and coöperating straightening means to engage the bottom longitudinal edge of the tubes.

11. In a machine for straightening loom tube frames, alining means to enter between the tubes to straighten the deflected tubes laterally, means to engage the top longitudinal edge of the tubes, means to engage the bottom longitudinal edge of the tubes, and means to move said two edge-engaging means toward each other to straighten the tubes edgewise.

12. In a machine for straightening loom tube frames, alining means to enter between the tubes to straighten the deflected tubes laterally, means to engage the top longitudinal edge of the tubes, means to engage the bottom longitudinal edge of the tubes, means to move said two edge-engaging means toward each other to straighten the tubes edgewise, and means to reform the walls of the tubes from within.

13. In a machine for straightening loom tube frames, alining means to enter between the tubes to straighten the deflected tubes laterally, means to engage the top longitudinal edge of the tubes, means to engage the bottom longitudinal edge of the tubes, means to move said two edge-engaging means toward each other to straighten the tubes edgewise, means to reform the walls of the tubes from within, and means to clamp the tube frame while being reformed.

14. A machine for straightening loom tube-frames, having endwise positioning means whereby a tube frame is caused to occupy predetermined endwise position in the machine, combined with mechanism for straightening and re-forming tubes of the tube-frame.

15. A machine for straightening loom tube-frames, having sidewise positioning means whereby a tube frame is caused to occupy a predetermined sidewise position in the machine, combined with mechanism for straightening and re-forming tubes of the tube-frame.

16. A machine for straightening loom tube-frames, having edgewise positioning means whereby a tube-frame is caused to occupy a predetermined edgewise position in the machine, combined with mechanism for straightening and re-forming tubes of the tube-frame.

17. A machine for straightening loom tube-frames, having means to gage the end holders of the tube-frame, combined with mechanism for straightening and re-forming the tubes of the tube-frame.

18. In a machine for straightening loom tube frames, holding means for holding a tube frame, including pressure-applying means enabling the operator to bring special pressure at points wherever desired throughout the length of the frame, combined with mechanism for straightening and reforming the tubes of the tube frame.

19. In a machine for straightening loom tube frames, mechanism for straightening and reforming and bending the walls of the tubes of the tube frame, including pressure-applying means enabling the operator to bring special pressure adjacent one end of the frame.

20. In a machine for straightening loom tube frames, mechanism for straightening and reforming the tubes of the tube frame, including a member extending longitudinally of the tube frame, provided with a series of grooves accurately fitting a corresponding series of tubes for receiving the individual tubes.

21. In a machine for straightening loom tube frames, mechanism for straightening and reforming the tubes of the tube frame, including a movable member extending longitudinally of the tube frame, provided with a series of grooves accurately fitting a corresponding series of tubes for receiving the individual tubes.

22. In a machine for straightening loom tube frames, mechanism for straightening and reforming the tubes of the tube frame, including a member extending longitudinally of the tube frame, provided with a series of grooves for receiving the individual tubes, and a series of knife-like straighteners for entering between the tubes.

23. A machine for straightening the long, thin-walled, contiguous, tapering tubes of loom tube frames, comprising forming mechanism and means for maintaining the tube frame at right angles to said forming mechanism, said forming mechanism including a former provided with a wedge-shaped expander capable of entering within said tubes and restoring distorted portions of the walls of said tubes to original true shape at any misshapen point in the length of the tubes, and means for relatively moving in the straightening operation said former and tube frame while maintaining the latter in its said right-angle position.

24. In a machine for straightening loom tube-frames, means for holding a frame, and a former provided with a tapering expander for entering within a tube, formed and of a length to engage all parts of the interior thereof simultaneously, and provided with a conical end for engaging and restoring the opposite edge of the free end of the tube, and means for relatively moving said former and tube-frame support in the straightening operation.

25. In a machine for restoring to original straight condition the long thin-walled contiguous tapering tubes of loom tube-frames, means for holding such frame, and a device shaped to conform to the normal interior walls of such tubes and having a conical portion arranged to engage and re-form upset ends, and operating means therefor.

26. In a machine for restoring to original straight condition the long, thin-walled, contiguous, tapering tubes of a loom tube frame, a former, provided with deflecting means operating within the tubes from the butt ends of the tubes toward the small ends thereof, to aline and straighten the said tubes with relation to each other, and operating mechanism for relatively moving said deflecting means and said tubes in the correct path for said tubes with relation to the tube frame irrespective of the incorrect, deflected positions which certain of said tubes or portions thereof occupy with relation to the tube frame at the beginning of said movement.

27. In a machine for restoring to original straight condition the long, thin-walled, contiguous, tapering tubes of a loom tube frame, a former, provided with deflecting means operating within the tubes from the butt ends of the tubes toward the small ends thereof, to aline and straighten the said tubes with relation to each other, operating mechanism for relatively moving said deflecting means and said tubes in the correct path for said tubes with relation to the tube frame irrespective of the incorrect, deflected positions which certain of said tubes or portions thereof occupy with relation to the tube frame at the beginning of said movement, and external bracing means adapted to engage and sustain the said thin walls and to coöperate with said alining means in shaping a distorted tube.

28. A machine for reforming the tubes of loom tube frames, comprising a clamp for the tube frame arranged to leave the tubes free, means acting laterally on the exterior of the tubes, and means acting longitudinally on the interior of the tubes, for straightening and reforming the same.

29. A machine for reforming the tubes of loom tube frames, comprising a clamp for the tube frame arranged to leave the tubes free, re-alining mechanism arranged to act laterally upon the exterior of the tubes, and a reshaping former mounted to engage the interior of the tubes in a longitudinal movement.

In testimony whereof, I have signed my name to this specification, in the presence of two subscribing witnesses.

THOMAS P. WALSH.

Witnesses:
M. J. Spalding,
Wm. J. Pike.

Copies of this patent may be obtained for five cents each, by addressing the "Commissioner of Patents, Washington, D. C."